United States Patent [19]

Ruf

[11] 3,830,598
[45] Aug. 20, 1974

[54] HOUSINGS FOR ROTARY COMBUSTION ENGINES

[75] Inventor: Max Ruf, Obereisesheim, Germany

[73] Assignees: Audi Nsu Auto Union Aktiengesellschaft, Neckarsulm; Wankel G.m.b.H, Lindau, Bodensee, both of, Germany

[22] Filed: Jan. 5, 1973

[21] Appl. No.: 321,286

[30] Foreign Application Priority Data
Jan. 15, 1972 Germany............................ 2201886

[52] U.S. Cl.................... 418/60, 418/61 A, 418/83, 418/270, 29/156.4 R, 164/133
[51] Int. Cl. ... F01c 21/06, B23p 15/00, B22d 27/10
[58] Field of Search ............ 418/60, 61 A, 83, 270; 123/8.01, 41.82 A; 29/156.4 R; 164/113, 303

[56] References Cited
UNITED STATES PATENTS

| | | | |
|---|---|---|---|
| 2,117,662 | 5/1938 | Heinze................................. | 418/60 |
| 3,234,922 | 2/1966 | Froede............................... | 123/8.01 |
| 3,357,412 | 12/1967 | Sabet................................. | 123/8.01 |
| 3,374,943 | 3/1968 | Cervenka............................... | 418/83 |

FOREIGN PATENTS OR APPLICATIONS
1,022,845   1/1958   Germany........................... 123/8.01

*Primary Examiner*—Carlton R. Croyle
*Assistant Examiner*—John J. Vrablik
*Attorney, Agent, or Firm*—Raymond P. Wallace

[57] ABSTRACT

Die-cast housings for rotary combustion engines of the trochoidal type, having parallel side plates spaced apart by an annular peripheral shell, the side plates being double-walled and having the exterior wall of greater radial extent than the inner wall with internal coolant passages therebetween opening generally radially outwardly, the peripheral shell also being double-walled and having the exterior wall of greater axial extent than the inner wall and having axial internal coolant passages therebetween, the axial extensions of the peripheral shell abutting the radial extensions of the side plates and thereby placing the passages of the shell in communication with those of the side plates, the side plates being rendered suitable for pressure die-casting by reason of the radial openings of their passages.

6 Claims, 5 Drawing Figures

HOUSINGS FOR ROTARY COMBUSTION ENGINES

BACKGROUND OF THE INVENTION

This invention relates to trochoidal rotary combustion engines, and more particularly to fluid cooled housings for such engines, suitable for die-casting.

Rotary engine housings are known having passages in the side plates and in the peripheral shell for circulation of a cooling fluid. Such an engine is shown in U.S. Pat. No. 3,096,746. In engines as shown therein there would be no serious problem in diecasting the peripheral shell, since the coolant passages in the wall thereof extend from end to end in the axial direction. However, the passages in the side plates, which are in the main radial in direction, must make a right angle turn near the periphery of the plates in order to mate with the passages in the shell. In multirotor engines with a plurality of engine cavities there is the same difficulty with the intermediate side plates between rotors, since they are side plates to individual engine cavities.

For this reason such plates have heretofore been cast with sand cores to form the passages. This process is slow and expensive, and not suitable for large-scale production.

SUMMARY

This invention overcomes the foregoing disadvantages of the prior art and a wholly die-cast rotary engine housing is produced by providing double-walled side plates having internal passages therein opening in the generally radially outward direction and with the outer wall of the plate extending farther in the radial direction than the inner wall, and a double-walled peripheral shell with axial passages therein and the outer wall thereof extending axially farther than the inner wall and meeting the extended outer walls of the side plates in sealing relation, the internal passages of the side plates and of the peripheral shell being thereby in communication. Side plates of this type may be formed in a pressure-casting tool with the generally radial passages formed therein by a plurality of radially movable slides of the tool. The parts of the housing are clamped together by means of bolts extending axially through bores between the coolant passages.

In the case of a multirotor engine with axially aligned engine cavities the intermediate side plates or plates between rotors are likewise double-walled and formed with generally radially opening internal coolant passages. The intermediate side plate may have one of its walls extending farther in the radial direction than the other and the outer ends of its passages covered by the axial extension of an adjacent shell, or both walls of the intermediate side plate may be of short radial extent and the passages covered by the axial extensions of both adjacent shells which then abut sealingly against each other.

The axial extensions are preferably integral with the shell. However, it is within the scope of the invention for these axial extensions to be separate parts that cooperate sealingly with the end faces of the shell.

Various hypereutectic aluminum alloys are suitable materials for the pressure die-casting of all parts of the housing, including side plates, intermediate side plates, peripheral shell, and separable axial extensions of the shell.

It is therefore an object of this invention to provide a rotary engine housing wherein both types of side plates can be produced by pressure-casting.

It is another object to provide a rotary engine housing wherein such side plates have internal passages opening generally radially outwardly.

A further object is to provide a die-cast rotary engine housing in which such radially opening passages in the side plates communicate with axially opening passages in the peripheral shell.

Other objects and advantages will become apparent on reading the following specification in connection with the accompanying drawings.

DESCRIPTION OF THE PREFERRED EMBODIMENTS

Figure 1:
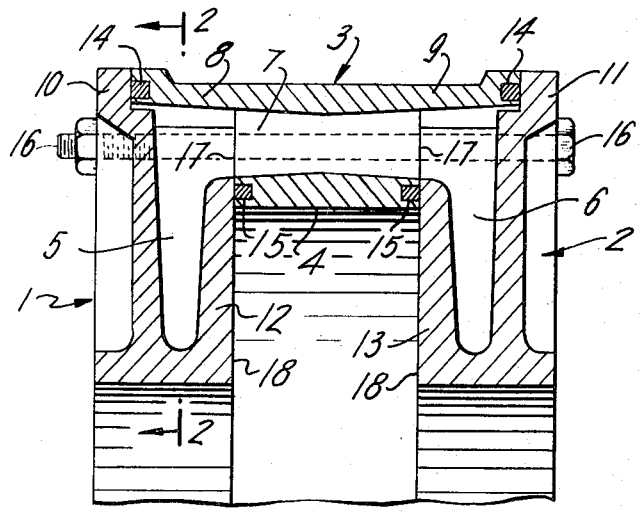
FIG. 1 is a longitudinal cross-section of a rotary engine housing, in which only the upper half of the housing above the longitudinal axis is shown.

FIG. 1 shows the housing of a single-rotor combustion engine, comprising a pair of double-walled parallel side plates 1 and 2, and a double-walled generally annular peripheral shell 3 disposed between the side plates, the inner wall 4 of the shell having an inner surface in the form of a two-lobed epitrochoid.

Side plate 1 has an outer wall 10 and an inner wall 12, the outer wall 10 being of greater radial extent than inner wall 12, and has a plurality of cored cavities or coolant passages 5 between the walls. Side plate 2 has an outer wall 11 and an inner wall 13, the outer wall also being of greater radial extent than the inner wall, and has passages 6 therebetween. The passages 5 and 6 of the side plates open generally radially outwardly, beside the outer walls 10 and 11 of the plates. The double-walled peripheral shell 3 has a plurality of axial passages 7 in communication with passages 5 and 6 of the side plates, through all of which passages a cooling fluid circulates.

The outer wall of shell 3 has at its ends axial extensions 8 and 9 which increase its axial length beyond that of the inner shell wall 4 which spaces apart the inner plate walls 12 and 13. The axial extensions 8 and 9 cover the openings of the plate passages 5 and 6 and bear sealingly against the outer walls 10 and 11 of plates 1 and 2. For the purpose of sealing the communicating passages 5, 6, 7 against leakage to the outside, seal rings 14 are disposed in circumferential grooves in the end surfaces of axial extensions 8 and 9. To seal the passages against internal leakage to the engine cavity, seal rings 15 are disposed in circumferential grooves in the end faces of the shell inner wall 4, and bear against the inner faces 18 of the inner walls 12 and 13 of the side plates.

The connection of the three parts of the housing may be made, for example, by bolts 16, which may be made as through-bolts passing through bores between the coolant passages and clamping the parts of the housing together axially, or they may be short bolts from each side mating with tapped holes in the shell. Metallic contact between the shell and the side plates occurs only between the end faces 17 of the shell and the inner faces 18 of the side plates. Direct metallic abutment of the end faces of the axial extensions 8 and 9 against the outer walls 10 and 11 of the side plates is unnecessary, since the seal rings 14 provide adequate sealing, and it would also create a difficulty in spacing the side walls apart, since they would be required to pilot in two places. For this reason the axial extensions may be made a few thousandths of an inch short of the distance between walls 10 and 11.

The formation of passages 7 in the peripheral shell can be readily seen in FIG. 1. Since the passages are axial throughholes, they are simply made with coring portions of the die, extending inwardly from each side and having a slight draft for easy removal. Webs integral with the inner and outer walls of the shell separate the passages 7 from one another.

Figure 2:
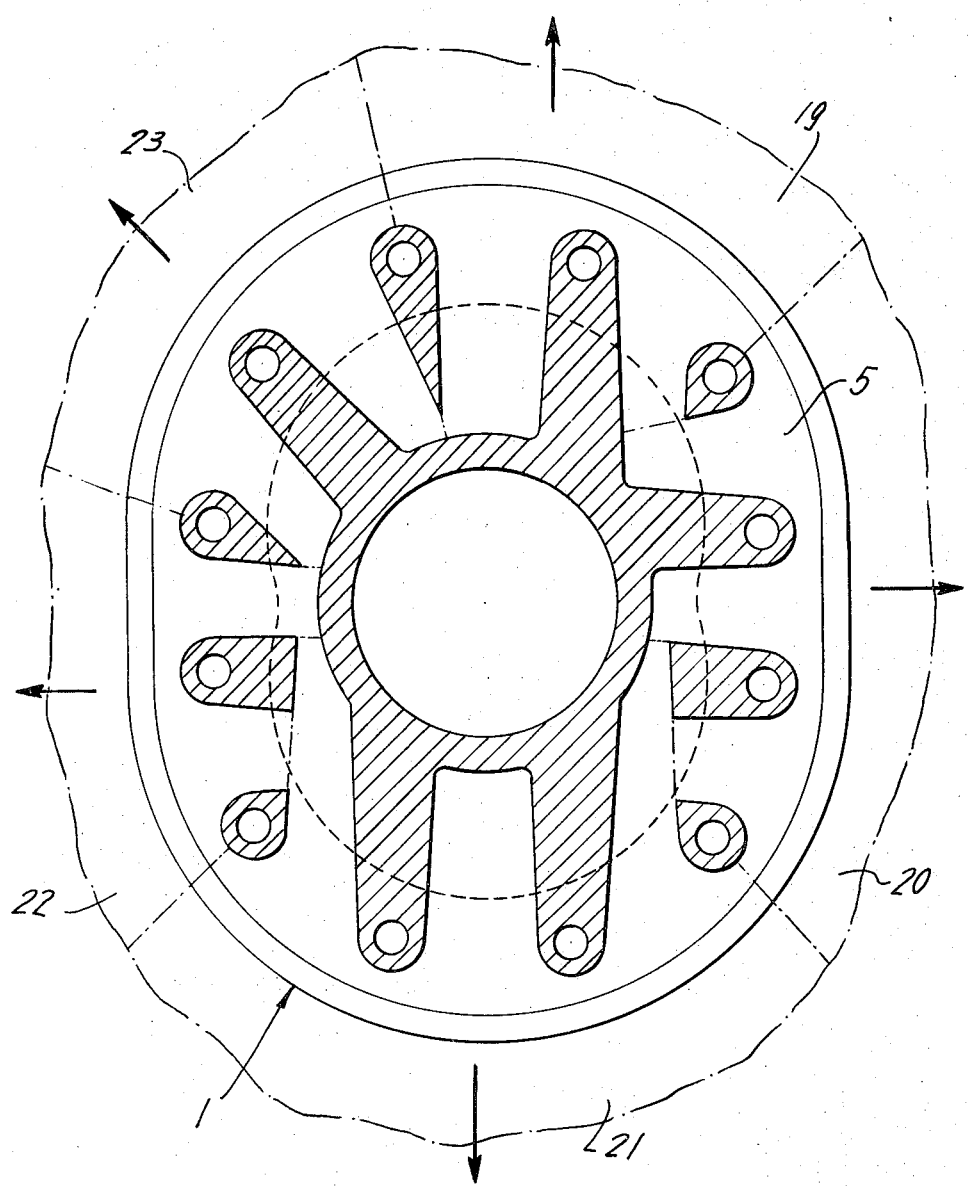
FIG. 2 is a section of one of the side plates, taken on line 2—2 of FIG. 1.

The manner of forming the passages 5 and 6 of the side plates will be seen from the sectional view of plate 1 in FIG. 2. The passages 5 are designed so that they can be formed by radially movable slides or coring portions of the pressure casting tool. These slides are schematically shown by dot-dash lines, and indicated by numerals 19 to 23. They are translatable along directions radial from the center of the crank aperture of the plate, as shown by the arrows. When they are in their inmost position and the tool is closed, ready for casting, they leave spaces for the casting metal to form a hub portion integral with the outer wall 10 and the inner wall 12, and generally radial web portions between passages 5 which are also integral with the plate walls. When the slides are retracted radially outwardly they leave the passages 5 which extend generally radially between the double walls and open in the generally radial direction. Holes for bolts 16 may be bored through the web portions. The passages 6 in side plate 2 are formed in a corresponding manner.

Figure 3:
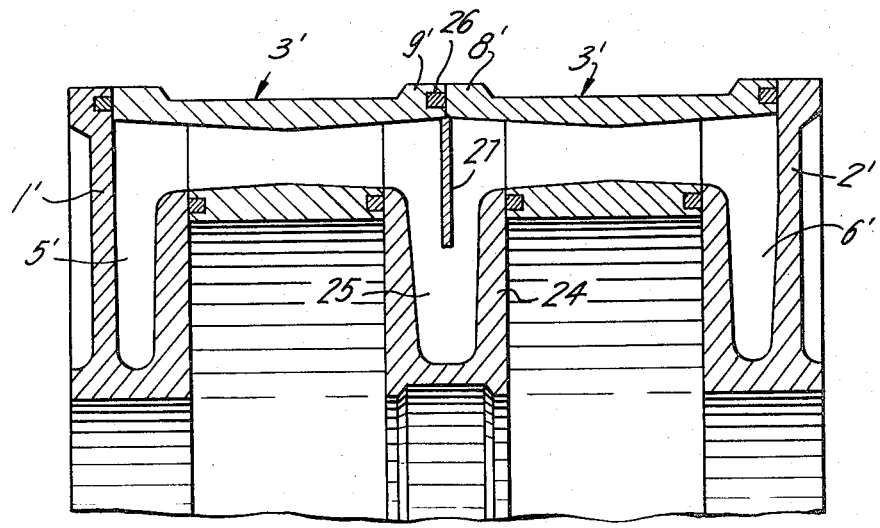
FIG. 3 is a longitudinal cross-section of a two-rotor engine housing, showing only the upper half.

In FIG. 3 there is shown the housing of a two-rotor internal combustion engine, comprising side plates 1' and 2' and two peripheral shells 3', which are similar in construction to those of FIG. 1. There is also provided an intermediate side plate 24 disposed between the shells and separating the two engine cavities. Plate 24 is double-walled with passages 25 between the walls, but both walls of the intermediate side plate have only the same radial extent as the inner walls of plates 1' and 2'. The passages 25 open generally radially outwardly, and are covered by the axial extensions 8' and 9' of the adjacent shells, which axial extensions abut sealingly, there being provided a groove in the end face of extension 9' in which is disposed a seal ring 26. To prevent the cooling fluid from flowing directly from one shell into the other and bypassing the intermediate side plate, there are provided a plurality of guide plates 27. A guide plate 27 extends radially inwardly from the periphery of plate 24 into each of the passages 25 for a distance sufficient to direct the coolant flow from the shells into the passages 25. These guide plates are positioned in the pressure-casting mold prior to closing it for the injection. Similar guide plates may also be provided in passages 5' and 6' of the side plates, if desired.

Figure 4:
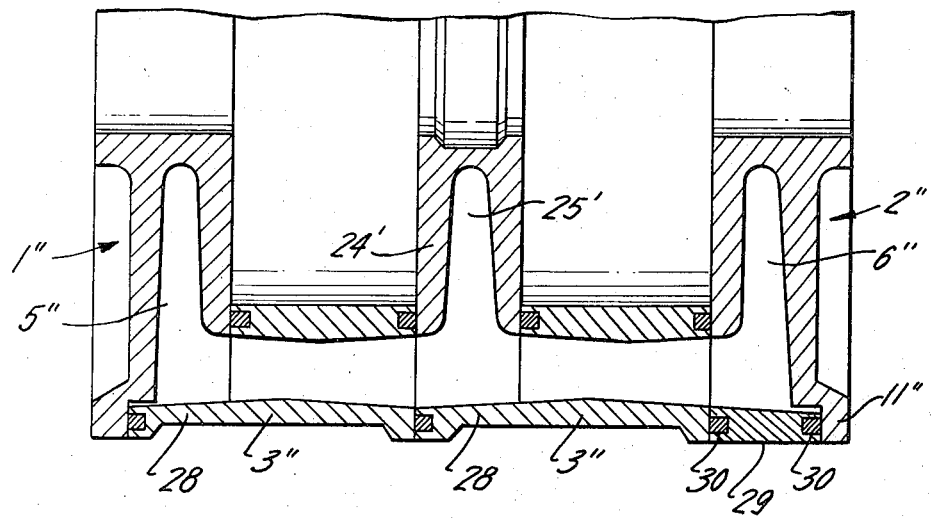
FIG. 4 is a longitudinal cross-section of a modified embodiment of a two-rotor engine housing, in which the lower half of the housing below the longitudinal axis is shown.

The example of construction shown in FIG. 4 differs from that of FIG. 3 principally in that the two shells 3" each have an axial extension 28 at only one side, in one case covering the passages 5" of side plate 1", and in the other case covering passages 25' of the intermediate side plate 24'. The passages 6" of side plate 2" are covered by a generally annular constructional part 29 which forms a separable axial extension of the adjacent shell. Part 29 bears a groove on each end face, in which grooves are disposed seal rings 30 so that the annular part 29 is sealed against its adjacent shell 3" and against outer wall 11" of plate 2". In the embodiment of FIG. 4 guide plates 27 may also be provided for the passages 25' of the intermediate side plate.

Figure 5:
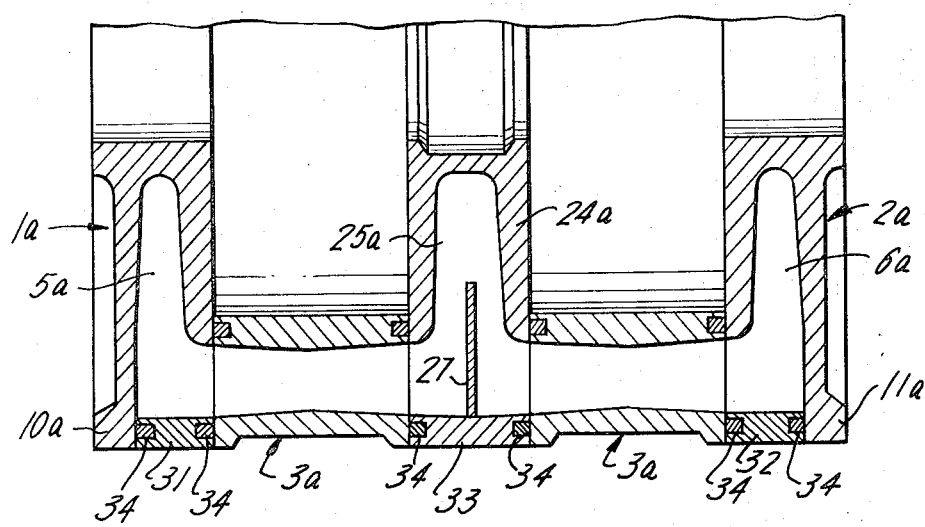
FIG. 5 is a longitudinal cross-section of a further modified embodiment of a two-rotor engine housing, showing the lower half.

In the example of construction shown in FIG. 5 the passages 5a, 6a, and 25a in plates 1a, 2a, and 24a respectively open radially outwardly and are covered by generally annular constructional parts 31, 32, and 33 which form separable axial extensions of the two shells 3a. Each of the annular parts 31, 32, and 33 has a groove in each of its end faces, in which are positioned the seal rings 34, which seal against adjacent shells and against the outer walls 10a and 11a of plates 5a and 6a. This type of construction can, if desired, also be used with a single-rotor combustion engine such as that shown in FIG. 1, and in multirotor engines of more than two rotors. Also, in each case where a groove for a seal ring is shown in one part, it may instead be formed in the abutting part.

In all the embodiments of FIGS. 3, 4, and 5 the internal passages of the side plates and of the intermediate side plates are formed by radially movable slides of the pressure-casting tool, as described above and shown in FIG. 2.

What is claimed is:

1. A housing for rotary internal combustion engines having at least two double-walled side plates and at least one double-walled annular peripheral shell disposed between the side plates and bearing sealingly against the inner face of the side plates, wherein the improvement comprises:

a. the side plates being die castings having a plurality of internal coolant passages between the double walls thereof, the passages having apertures disposed around the circumference of the side plates and opening in the generally radially outward direction, b. the peripheral wall being a die casting having a plurality of internal coolant passages between the double walls thereof and having apertures opening in the axial direction, c. the outer wall of the double-walled shell having an axial extension of greater axial length than the inner wall thereof, the axial extension of the outer wall being sufficient to cover the radial openings of the side plate coolant passages in such a manner that each of the side plate passages is in communication with a peripheral shell passage.

2. The combination recited in claim 1, wherein the outer walls of the double-walled side plates extend radially outwardly beyond the inner walls, and the axial extensions of the outer shell wall have axial end faces bearing sealingly against the outer wall of the side plates.

3. The combination recited in claim 1, wherein the axial extensions of the peripheral shell are integral with the outer wall of the shell.

4. The combination recited in claim 1, wherein the axial extensions of the peripheral shell are separate annular parts which cooperate sealingly with the end faces of the outer wall of the shell.

5. The combination recited in claim 1, wherein the housing has a plurality of axially aligned annular peripheral shells, and a die cast double-walled intermediate side plate disposed between adjacent shells, the intermediate side plate having internal coolant passages opening generally radially outwardly, the passage openings of the intermediate side plate being covered by an axial extension of at least one adjacent shell and in communication with the shell passages.

6. The combination recited in claim 5, wherein the intermediate side plate is completely covered by axial extensions of both adjacent shells, the axial extensions having end faces which bear sealingly against each other.

* * * * *